United States Patent [19]

Dlugos

[11] Patent Number: 5,841,541
[45] Date of Patent: Nov. 24, 1998

[54] APPARATUS AND METHOD FOR DIMENSIONAL WEIGHING UTILIZING A ROTATING SENSOR

[75] Inventor: Daniel F. Dlugos, Shelton, Conn.

[73] Assignee: Pitney Bowes Inc., Stamford, Conn.

[21] Appl. No.: 775,213

[22] Filed: Dec. 31, 1996

[51] Int. Cl.⁶ ............................ G01B 11/02; G01B 11/06; G01B 11/28
[52] U.S. Cl. .......................... 356/383; 356/381; 356/384; 356/379
[58] Field of Search ..................................... 356/381, 383, 356/384, 387, 379, 380; 364/562–564

[56] References Cited

U.S. PATENT DOCUMENTS

| | | | |
|---|---|---|---|
| 4,063,820 | 12/1977 | Borgese | 356/383 |
| 4,528,651 | 7/1985 | Brock et al. | 367/99 |
| 4,914,307 | 4/1990 | Kanev | 356/387 |
| 5,004,929 | 4/1991 | Kakisoki et al. | 356/376 |
| 5,102,223 | 4/1992 | Uesugi et al. | 356/376 |
| 5,325,178 | 6/1994 | Louis et al. | 356/381 |
| 5,331,118 | 7/1994 | Jensen | 177/25.14 |
| 5,477,622 | 12/1995 | Skalnik | 33/781 |
| 5,481,298 | 1/1996 | Sasaki | 348/135 |
| 5,485,410 | 1/1996 | Mastromattei | 364/705.01 |
| 5,486,063 | 1/1996 | Fox et al. | 400/708 |

*Primary Examiner*—Frank G. Font
*Assistant Examiner*—Amanda Merlino
*Attorney, Agent, or Firm*—Robert H. Whister; Melvin J. Scolnick

[57] ABSTRACT

The invention is a method and apparatus for measuring the dimensions of a parcel. The invention begins by placing a parcel in the corner of a field of measurement upon a flat surface and against two adjacent walls. At the base of each wall, and along the angle where the adjacent walls meet, is a calibrated reflective strip. The calibration marks on each of the reflective strips are of known size and spacing. One or more sensors are activated and read the number of visible calibrated marks. The one or more sensors transmits this data to a processor which calculates the measurement for the length, width, and height of the parcel by subtracting the observed visible calibration marks from the number of possible calibration marks. If the flat surface, upon which the parcel has been placed is the weighing surface of a scale, then weight for the parcel can be determined. Each of the then calculated dimensions (length, width, height, and weight) can then be displayed and/or transmitted to a parcel processing system. Alternatively, the flat surface upon which the parcel is to be placed would require only one adjoining wall. Calibration marks are placed directly upon the flat surface and upon the one adjoining wall. The calibration marks on the flat surface appear as lines forming a chevron pattern progressing outwardly from a surface corner. The calibration marks on the adjoining wall are placed upon the wall from bottom to top.

16 Claims, 4 Drawing Sheets

APPARATUS AND METHOD FOR DIMENSIONAL WEIGHING UTILIZING A ROTATING SENSOR

Related Applications

Reference is made to application Ser. No. 08/775,850 (Attorney Docket No. E-376), entitled APPARATUS AND METHOD FOR DIMENSIONAL WEIGHING UTILIZING A LASER SCANNER, assigned to the assignee of this application and filed on even date herewith.

Reference is made to application Ser. No. 08/775,672 (Attorney Docket No. E-377), entitled METHOD FOR DIMENSIONAL WEIGHING UTILIZING POINT DETERMINATION, assigned to the assignee of this application and filed on even date herewith.

Reference is made to application Ser. No. 08/775,673 (Attorney Docket No. E-378), entitled METHOD FOR DIMENSIONAL WEIGHING UTILIZING SPACED LINE PROJECTION, assigned to the assignee of this application and filed on even date herewith.

Reference is made to application Ser. No. 08/775,671 (Attorney Docket No. E-379), entitled METHOD FOR DIMENSIONAL WEIGHING WITH OPTICS, assigned to the assignee of this application and filed on even date herewith.

Reference is made to application Ser. No. 08/775,549 (Attorney Docket No. E-383), entitled LOW COST DIMENSIONAL DETERMINING SYSTEM, assigned to the assignee of this application and filed on even date herewith.

Reference is made to application Ser. No. 08/775,851 (Attorney Docket No. E-384), entitled COARSE VOLUME MEASUREMENT WITH INTERLOCK, assigned to the assignee of this application and filed on even date herewith.

Reference is made to application Ser. No. 08/775,675 (Attorney Docket No. E-385), entitled DIMENSIONAL WEIGHING APPARATUS, assigned to the assignee of this application and filed on even date herewith.

Reference is made to application Ser. No. 08/775,550 (Attorney Docket No. E-386), entitled DIMENSIONAL WEIGHING UTILIZING A FOLLOWING ARM MECHANISM, assigned to the assignee of this application and filed on even date herewith.

Reference is made to application Ser. No. 08/775,214 (Attorney Docket No. E-387), entitled DIMENSIONAL WEIGHING UTILIZING A LINEAR DISPLACEMENT TRANSDUCER, assigned to the assignee of this application and filed on even date herewith.

Reference is made to application Ser. No. 08/775,674 (Attorney Docket No. E-430), entitled APPARATUS AND METHOD FOR DIMENSIONAL WEIGHING UTILIZING A MIRROR AND/OR PRISM, assigned to the assignee of this application and filed on even date herewith.

BACKGROUND OF THE INVENTION

The increased efficiencies brought by the improvements in data processing systems has helped foster increased competition among parcel and package carriers. There has been a great expansion of the services offered to shippers and in the calculation of shipping charges available to both the casual shipper and the high volume shipper. The challenge that carriers face is to develop a method of charging for carrier services that more closely reflects the reality of what shippers actually need in the way of carriage services. The development of certain efficiencies of transport and materials handling together with electronic invoicing and parcel tracking, has created an environment where carriers are now able to offer shippers mixed modes of transport, overnight delivery, better tracking of parcel movement, and discount rates in return for the utilization of labor and cost saving measures such as: bar coding; bulk delivery; pre-sorting; and, dimensional weighing.

One of the efficiencies of operation is the use of dimensional determination. Carriers have a need to accurately determine the amount of capacity required to meet shipping demands. By determining dimensions other than, or in addition to, weight, then shippers can pack goods more efficiently (i.e., build a pallet according to the needs of the transport mode) and carriers can fill a shipping container (ship, rail, truck, air) more efficiently.

Carrier rates based on dimensional determination generally reward shippers for labeling parcels with dimensional characteristics or for separating out those parcels not meeting certain dimensional prerequisites. The technology associated with dimensional determination has proliferated as the requirements have grown. However, the essential movement of packages at a shipper site have remained the same; packages must still move through a prep area where identification labels of varied type are applied to the parcel, and where manifests can be assembled even if they are downloaded elsewhere. Package movement through the prep area is facilitated by chutes, conveyors, rollers, or simply through human intervention with the occasional platform for weighing, measuring, or marking.

Dimensional determination is employed in various manners. U.S. Pat. No. 5,004,929 for an OPTICAL SYSTEM FOR DETECTING THREE DIMENSIONAL SHAPE; issued Apr. 2, 1991 to Kakinoki et al. (Kakinoki) is an example of dimensional determination designed to fit a specific need. In the case of Kakinoki, for instance, laser optics is employed to detect and measure a three dimensional shape. Kakinoki is important in its use of light power to compare images of items so that quality production can be maintained over a series of measured objects. If the images match, then the quality is maintained. Dimensional determination for shipping, however, is based on comparison of each object to be measured with a pre-existing but separate measuring standard. Kakinoki, on the other hand, compares each object being detected with other objects of its type, to determine a deviation.

U.S. Pat. No. 5,331,118 for a PACKAGE DIMENSIONAL VOLUME AND WEIGHT DETERMINATION SYSTEM FOR CONVEYORS, was issued Jul. 19, 1994 to Soren Jensen (Jensen). Jensen discloses a system for determining the dimensions of a parcel moving on a conveyor belt. The parcel passes over a strip with indicia indicating units of incremental measure to determine a width, and alongside a similar strip to determine height. The length of the parcel is determined by interrupting the path of a photo-electric eye. Weight is determined by using a weigh-in-motion conveyor scale. The Jensen disclosure provides a good example of how parcel handling is enhanced through the use of simple techniques that do not require a profusion of new hardware or cause parcel movement to be inefficient.

The use of incremental measure to determine dimension has, in a general fashion, long been known in the art; but, advancements in the data processing arts have created efficiencies of measure, calculation, and application that are only recently coming into use. For instance, the use of slit light to determine the extent of curvature of surface shape is disclosed in U.S. Pat. No. 5,102,223, issued Apr. 7, 1992 to Uesugi et al. (Uesugi). Uesugi discloses a method and apparatus for projecting slit light onto a curved surface to code that surface for position, time, or light projecting angle and then comparing the resulting image with an image of a non-curved surface to create a composite which is measurable in terms of variance form a norm. While Uesugi provides an excellent means for producing measurable composites, it is not an efficient means for providing dimensional determination of parcels because of the inherent expense, in time and cost, of producing composites.

The use of sound has been employed in several ways in making dimensional determinations. Long a staple of the Naval forces in locating ships, and now commonly utilized for identifying the location of schools of fish, sound waves can be readily measured to determine the location of points relative to a starting or neutral position. An example of the use of sound in determining the linear measurement of objects is U.S. Pat. No. 4,528,651, issued on Jul. 9, 1985 to Brock et al. (Brock). Brock teaches the measurement of objects, preferably cylindrical, by passing the objects through an array of transducers that perform echo ranging to determine length and diameter. Rectangularly shaped objects or parcels would be limited to only the measurements of length and height.

The ability to continuously monitor a field to be measured is known in the art; consider U.S. Pat. No. 5,325,178 for a METHOD OF MEASURING THE DIMENSIONS OF MOVING OBJECTS, issued on Jun. 28, 1994 to Louis et al. (Louis). Louis teaches that the length, width, and height of objects on a conveyor belt can be determined by utilizing fixed position CCD cameras to measure along predefined axes. The disadvantage to Louis is that the measuring devices (i.e., the CCD cameras) are sited along fixed lines, and therefore, objects of varied dimension can not be accurately measured.

Thus, an object of the present invention is to provide a cost effective means for determining the dimensions of a parcel. The ability of the shipper to enjoy reductions in rates from carriers by implementing certain efficiencies in operation, and to do so without slowing work flow or driving up costs, is a distinct advantage to be gained by the system user.

SUMMARY OF THE INVENTION

According to the invention, the object is achieved and the disadvantages of the prior art are overcome by a method and apparatus for measuring the dimensions of a parcel.

The method, which utilizes the apparatus, comprises several steps. These steps include: placing a parcel in the corner of a field of measurement where the field is defined by a flat surface to support the parcel and two adjacent walls meeting at substantially right angles with the flat surface. At the base of each wall is a calibrated reflective strip; additionally, another calibrated reflective strip is located along the angle where the adjacent walls meet. The strip runs from the point where the adjacent walls meet the flat surface upward to a height less than, or equal to, the height of the adjacent wall which actually supports the strip. The calibration marks on each of the reflective strips are of known size and spacing.

Once a parcel has been placed upon the flat supporting surface, a sensor is activated. The activated sensor is located in the corner of, or near to, the measurement field directly opposite the corner in which the parcel has been placed. The sensor reads the number of visible calibrated marks at the base of the adjacent upright walls and transmits this data to a data processor which calculates the measurement for the length and the width of the placed parcel by subtracting the observed visible calibration marks from a predetermined number of possible calibration marks.

To determine the height of the parcel, a second sensor is placed in, or near to, the measurement field in a position above the first sensor and high enough above the flat surface of the measurement field so as to measure the height of the parcel. The sensor reads the number of visible calibration marks along the angle formed where the adjacent upright walls meet and transmits this data to a data processor which calculates the measurement for the height of the placed parcel by subtracting the observed visible calibration marks from a predetermined number of possible calibration marks.

An additional dimension for the parcel can be calculated if the flat surface, upon which the parcel has been placed, is the weighing surface of a scale capable of calculating a weight for objects placed thereon. Each of the then calculated dimensions (length, width, height, and weight) can then be displayed on a display or monitor located with the dimensioning apparatus or remote to it. In addition to, or instead of, displaying the dimensions, each of the calculated dimensions can be transmitted to a parcel processing system where such dimensions are used to calculate shipping rates, available services, or modes of transportation.

The two sensors employed in the measuring process can be placed in combination so that they are either co-located or where one sensor is rotated in such a way as to scan on both the vertical and horizontal axis. The dual axis scanner would be placed at a corner of the field of measurement opposite the corner where the parcel to be measured has been placed. Additionally, the sensor would be placed high enough above the flat surface of the measurement field so as to detect all of the visible calibration marks on the two axis of measurement.

An alternative embodiment of the calibration system can be employed. The flat surface upon which the parcel is to be placed would require only one adjoining wall. Calibration marks are placed directly upon the flat surface and upon the one adjoining wall. The calibration marks on the flat surface appear in the form of encoder lines of known dimension and spacing marked thereupon. The encoder lines form a chevron pattern comprising an angle of 90_progressing outwardly from a predetermined corner of the field of measurement. The parcel to be measured is placed in the corner of the field from which the chevron pattern radiates. The calibration marks on the adjoining wall are in the form of lines of known size and spacing which are placed upon the wall from bottom to top.

To determine parcel length or height, only a single scanner needs to be employed and the flat surface to be used could be the weighing surface of a scale if a weight dimension needs to be determined.

The scanner to be employed is positioned directly opposite the corner in which the parcel has been placed. The scanner is capable of being rotated and is further positioned at a height where it can scan and count the visible lines that will constitute the length and width of the package dimensions as well as rotate upward to calculate the height of the package. Calculations are performed by subtracting the visible lines on the flat surface from the known number of lines. The calculations are then displayed as measurements and/or transmitted to a parcel processing system.

DETAILED DESCRIPTION OF THE PREFERRED EMBODIMENTS

Figure 1:
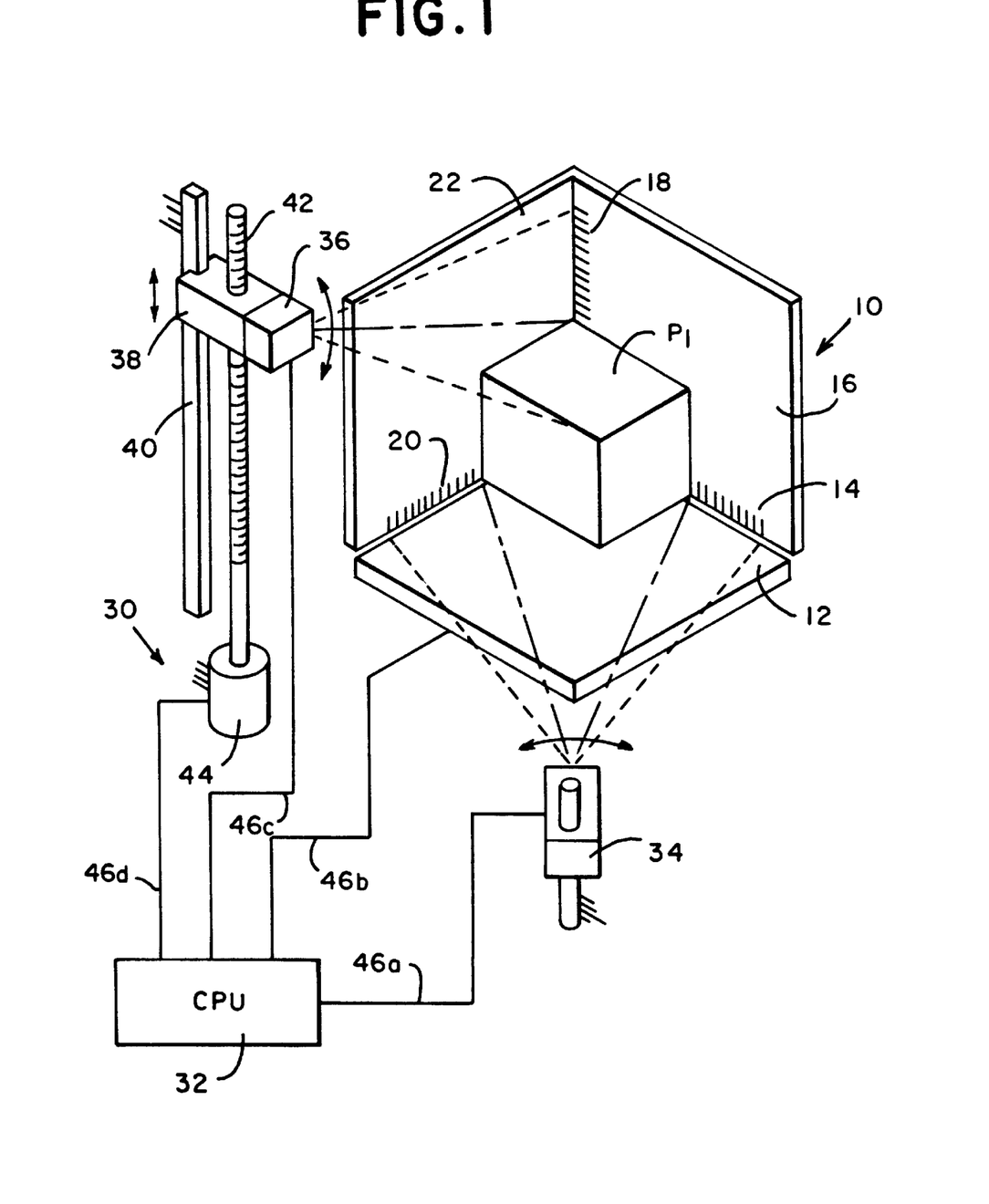
FIG. 1 is a drawing of the system apparatus showing the use of two separately located sensors to determine the linear measurements of a parcel.

Turning to FIG. 1, there is shown a preferred embodiment of the present invention wherein a representative parcel $P_1$ is placed on the surface of a platform 12 within a field of measurement designated as subsystem 10. Platform 12 is preferably the surface of a weighing scale capable of calculating the weight of parcel $P_1$ placed thereupon. Weight data is transmitted from weighing scale 12 to CPU 32 via interface cable 46b. An emitter scanner 34, under control of CPU 18 via cable interface 46a, is placed at a corner of the field of measurement that is directly opposite two upright adjacent walls 16 and 22 that are perpendicular to each other and attached to the base of platform 12.

Adjacent walls 16 and 22 each have at their base a corresponding calibrated reflective strip. Calibrated strip 14 is at the bottom of upright wall 16; and calibrated strip 20 is at the base of upright wall 22. Where the walls 16 and 22 meet to form a right angle, there is a calibrated reflective strip 18 on at least one of the upright walls running from the point where the upright walls 16 and 22 meet the base of platform 12 upward to a height less than, or equal to, the height of the at least one upright adjacent wall.

Parcel $P_1$ is placed on platform 12 in such a way that two sides of the parcel are placed directly against the upright walls 16 and 22, thus covering a portion of the calibration markings of the reflective strips 14, 18, and 20.

Subsystem 30 measures representative parcel $P_1$ located on platform 12. Subsystem 30 comprises a data processing system 32 (hereinafter referred to as CPU 32) which controls and directs a number of peripheral devices that include two emitter scanners 34 and 36.

Measurement of parcel $P_1$ is accomplished by emitting a beam of light as each of emitter scanners 34 and 36 rotate across the field of measurement. Light that is reflected back to each of the emitter scanners from the calibrated markings of the calibrated reflective strips 14, 18, and 20 is counted by recording the change in reflected light as emitter scanner 34 or emitter scanner 36 passes each calibration mark. Where the parcel to be measured ($P_1$) is covering the light reflective calibration marks, then emitter scanners 34 and 36 will not record any calibration marks. The light reflective data is transmitted by each emitter scanner to CPU 32 for evaluation and for calculation of the parcel dimensions. The calculation is performed by subtracting the number of observed calibration marking from a known number of possible calibration marks to determine a linear measurement along each of the package dimensions.

Emitter scanner 34 is rotatably mounted at one corner of the field of measurement and such that emitter scanner 34 can rotate through a range of 90_from left to right (or from right to left) wherein the range includes all of the calibration marks located along calibrated reflective strips 14 and 20. Additionally, emitter scanner 34 is mounted at a height that will allow emitter scanner 34 to emit a beam of light toward the calibrated reflective strips 14 and 20 and to receive a reflection back from the beam as it passes over calibration markings that are not covered by representative parcel $P_1$. Emitter scanner 34 is under the control and direction of CPU 32 via interface cable 46a.

Emitter scanner 36 is rotatably mounted on support block 38 at one corner of the field of measurement and such that emitter scanner 36 can rotate through a range of 90_from a level position to a down position wherein the range includes all of the calibration marks located along calibrated reflective strip 18. The mounting means of emitter scanner 36 comprises support block 38 which houses rotation means for rotating emitter scanner 36 through its 90_range. Data transmitted by emitter scanner 36 is transmitted via interface cable 46c to CPU 32. Additionally, screw post 42 bi-sects support block 38 in such a manner as to allow screw post 42 to raise or lower support block 38 under control of motor means 44 which is in turn under the control and direction of CPU 32 via interface cable 46d. As support block 38 is raised or lowered by the action of screw post 42, a notch bi-secting the end of the block opposite emitter scanner 36 is in contact with support slide 40 which prevents unnecessary lateral motion of support block 38 when it is being raised or lowered.

Figure 2:
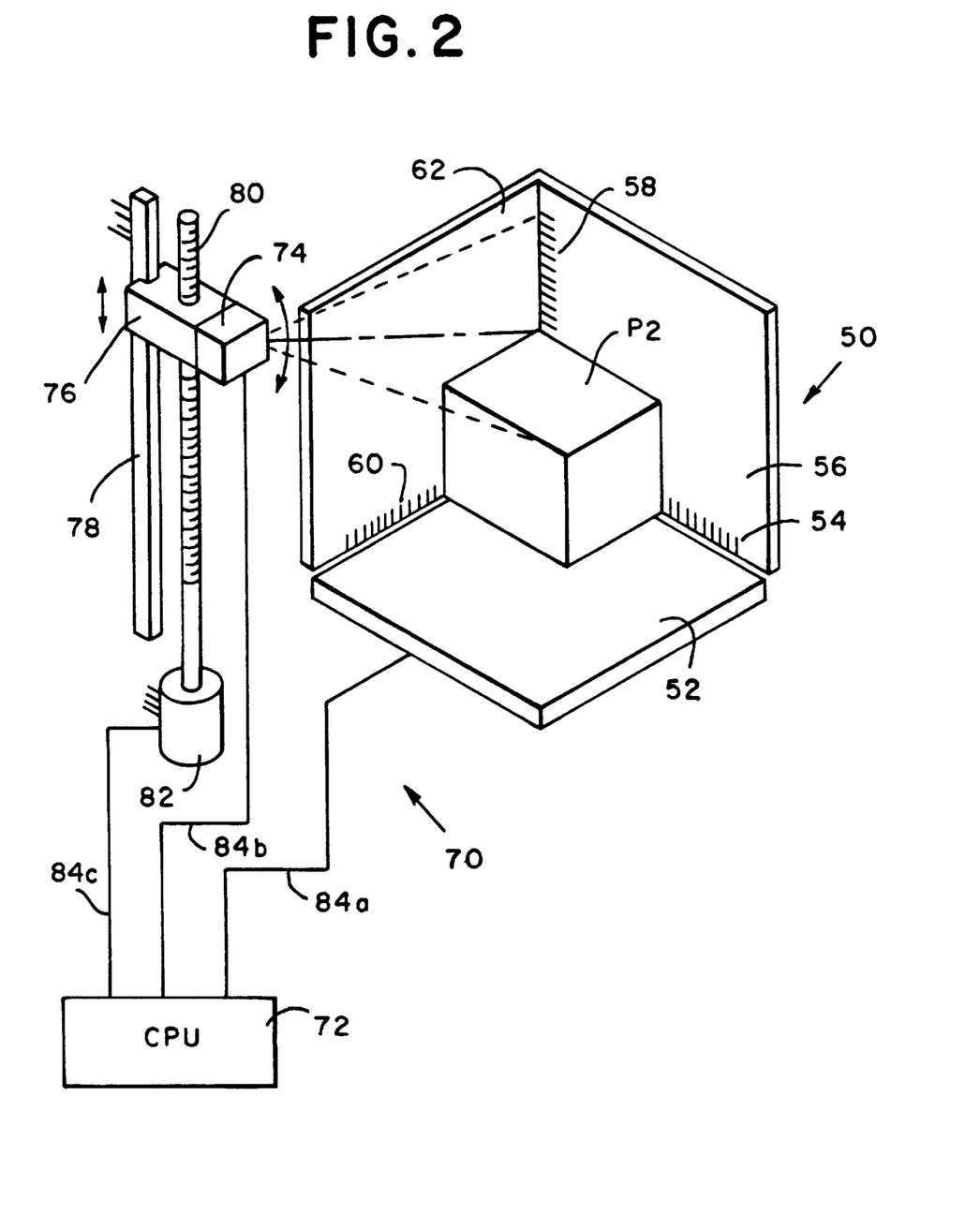
FIG. 2 is a drawing of an alternative embodiment of the system apparatus showing the co-location of the sensors used to determine the linear measurements of a parcel.

An alternative embodiment of the present invention is represented by FIG. 2 wherein a representative parcel $P_2$ is placed on the surface of a platform 52 within a field of measurement designated as subsystem 50. Platform 52 is preferably the surface of a weighing scale capable of calculating the weight of parcel $P_2$ placed thereupon. Weight data is transmitted from weighing scale 52 to CPU 72 via interface cable 84a.

Adjacent walls 56 and 62 each have at their base a corresponding calibrated reflective strip. Calibrated strip 54 is at the bottom of upright wall 56; and calibrated strip 60 is at the base of upright wall 62. Where the walls 56 and 62 meet to form a right angle, there is a calibrated reflective strip 58 on at least one of the upright walls running from the point where the upright walls 56 and 62 meet the base of platform 52 upward to a height less than, or equal to, the height of the at least one upright adjacent wall.

Parcel $P_2$ is placed on platform 52 in such a way that two sides of the parcel are placed directly against the upright walls 56 and 62, thus covering a portion of the calibration markings of the reflective strips 54, 58, and 60.

Subsystem 70 measures representative parcel $P_2$ located on platform 52. Subsystem 70 comprises a data processing system 72 (hereinafter referred to as CPU 72) which controls and directs a number of peripheral devices that include emitter scanner 74.

Emitter scanner 74 is rotatably mounted on support block 76 at one corner of the field of measurement and such that emitter scanner 74 can rotate through a range of 90_from a level position to a down position wherein the range includes all of the calibration marks located along calibrated reflective strip 58. Additionally, emitter scanner is mounted such that emitter scanner 74 can rotate through a range of 90_from left to right within the field of measurement. The mounting means of emitter scanner 74 comprises support block 76 which houses rotation means for rotating emitter scanner 74 through its downward 90_range. Rotation means for rotating emitter scanner 74 through its lateral range of motion is provided by screw post 80 which bi-sects support block 76 in such a manner as to allow screw post 80 to raise or lower support block 76 under control of motor means 82 which is in turn under the control and direction of CPU 72 via interface cable 84c. As support block 76 is raised or lowered by the action of screw post 80, a notch bi-secting the end of the block opposite emitter scanner 74 is in contact with support slide 78 which prevents unnecessary lateral motion of support block 74 when it is being raised or lowered. When left-right motion is required in order to make a 90_ lateral scan of the calibration marks, then support slide 78 is dis-engaged by support block 76. Data transmitted by emitter scanner 74 is transmitted via interface cable 84b to CPU 72.

Measurement of parcel $P_2$ is accomplished by emitting a beam of light as emitter scanner 74 rotates across the field of measurement. Light that is reflected back to the emitter scanner from the calibrated markings of the calibrated reflective strips 54, 58, and 60 is counted by recording the change in reflected light as emitter scanner 74 passes each calibration mark. Where the parcel to be measured ($P_2$) is covering the light reflective calibration marks, then emitter scanners 74 will not record any calibration marks. The light reflection data is transmitted from emitter scanner 74 to CPU 72, via interface cable 84b, for evaluation and for calculation of the parcel dimensions. The calculation is performed by subtracting the number of observed calibration markings from a known number of possible calibration marks to determine a linear measurement along each of the package dimensions.

Figure 3A:
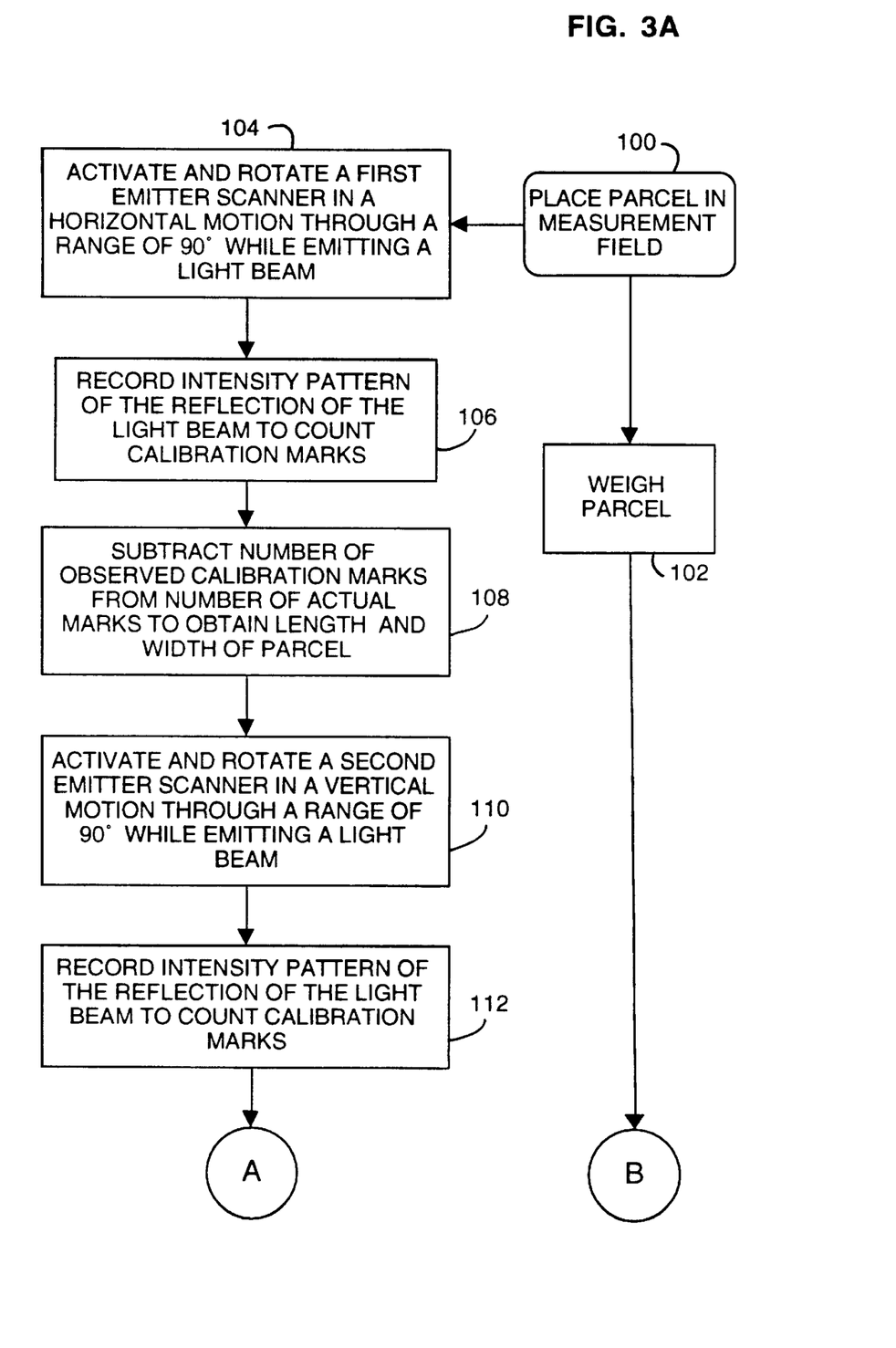
FIGS. 3A and 3B are a flowchart of the method of the present invention for dimensional weighing.
Figure 3B:
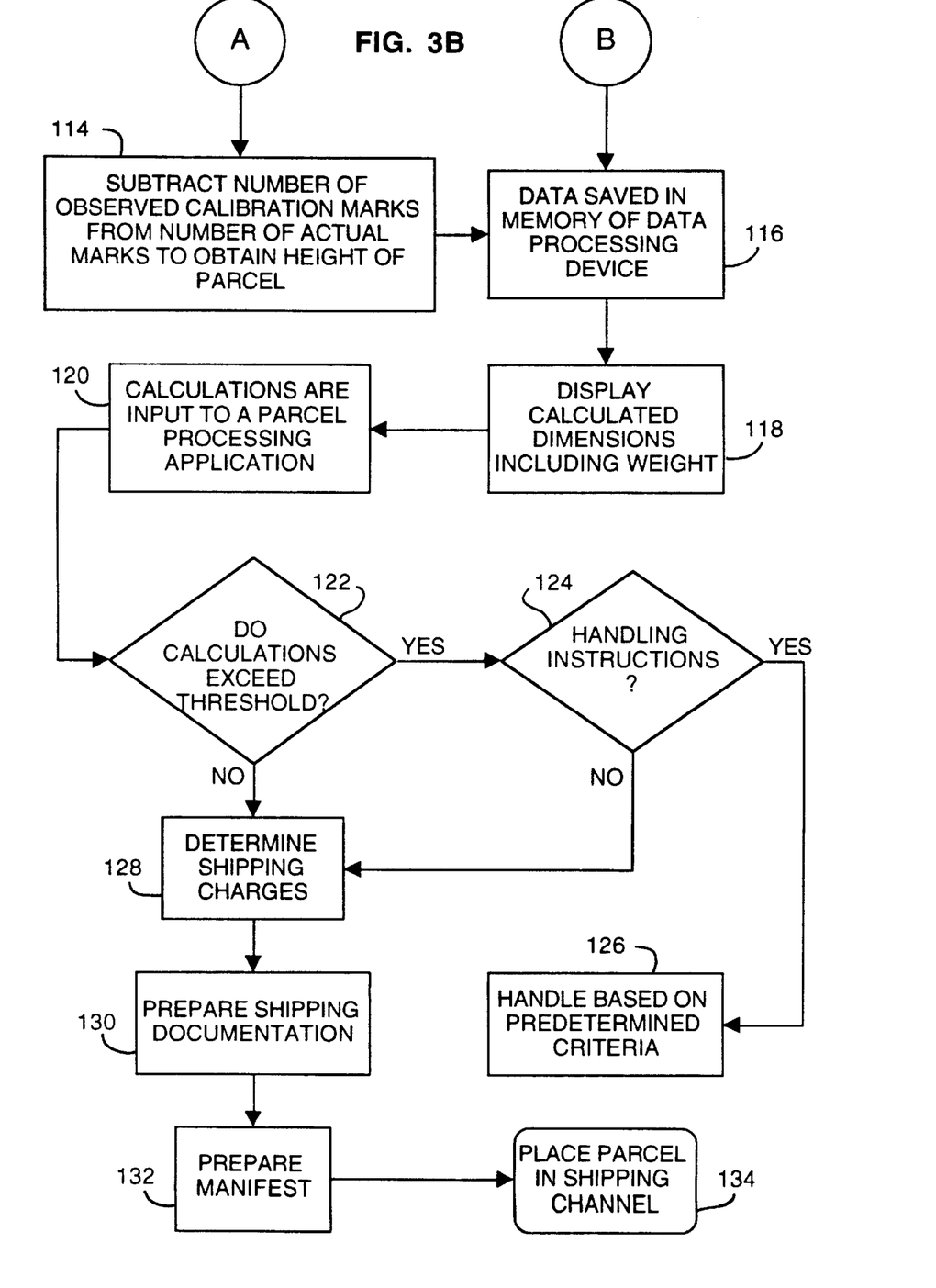

FIGS. 3A and 3B are a flowchart of the method of the present invention. Turning to FIG. 3A there is shown a parcel being placed onto a weighing platform in the field of measurement and directly into contact with a raised back wall and a raised side wall of the weighing platform. From step 100, the method advances essentially simultaneously to steps 102 and 104. If the platform upon which the parcel has been placed is the surface of a weighing scale, then the weighing scale will determine the weight of the parcel at step 102 before advancing along path B to re-enter the method flow at step 116, as shown in FIG. 3B, where the weight data is stored in a memory of a data processing system. If the platform upon which the parcel has been placed is not the surface of a weighing scale, then the method will not perform step 102.

As the parcel is being weighed at step 102, or if the platform is not the surface of a weighing scale, the method performs step 104 where a first emitter scanner is activated and rotated in a horizontal plane through a range of 90_ while emitting a beam of light. The beam of light is directed across the surface of a first calibrated reflective tape, at the base of and along one side of the wall against which the parcel rests and then across the surface of a second calibrated reflective tape which is positioned at the base of a second wall against which the parcel also rests. As the light passes over the calibration markings of the tape, it is reflected back toward the emitter scanner. The method then advances to step 106 where the calibration marks are counted, and then on to step 108 where the number of observed calibration markings is subtracted from the known number of calibration markings by a data processing device also controlling the first emitter scanner. By subtracting the known calibration markings from the known number of markings, the system can determine a specific number of marks which will correspond to the parcels length and width.

From step 108, the method advances to step 110 where a second emitter scanner is activated and rotated in a vertical plane through a range of 90_ while emitting a beam of light. The beam of light is directed across the surface of a third calibrated reflective tape located on at least one of the upright walls running from the point where the upright walls meet the base of the platform upward to a height less than, or equal to, the height of the wall. As the light passes over the calibration markings of the tape, it is reflected back toward the emitter scanner. The method then advances to step 112 where the calibration marks are counted.

The method advances from step 112 along path A to step 114 as shown in FIG. 3B. At step 114, the number of observed calibration markings is subtracted from the known number of calibration markings by a data processing device also controlling the first emitter scanner. By subtracting the known calibration markings from the known number of markings, the system can determine a specific number of marks which will correspond to the parcel's height. Step 114 then advances to step 116 where the calculations derived from the measurement of the parcel's length, width, height, and weight are stored within a memory of the data processing device for subsequent use in a parcel processing application program. From step 116, the method advances to step 118 where the stored data is distributed, under control of the CPU's application program, and the system displays the calculated dimensions and weight of the parcel to be processed. Essentially simultaneously to step 118, the calculations are input to a parcel processing application within the data processing device at step 120 which applies the data against a look-up table of values that correspond to a shipping charge as determined by a carrier's dimensional weighing guidelines.

From step 120, the method advances to a query at step 122 which asks whether or not the calculated dimensions of the parcel exceed a predetermined threshold value. The threshold value is determined by the carrier based upon a number of factors which include: class of service, mode of carriage; ease of handling; and, dimension.

If the response to the query at step 122 is "YES," then the method advances to a query at step 124 which asks if there are special handling instructions associated with a parcel corresponding to the measurements of the subject parcel. If the response to the query is "NO," then the method advances to step 128. If the response to the query at step 124 is "YES," however, then the method advances directly to step 126 where the parcel is further handled according to pre-determined criteria which may include: rejection of the parcel by the carrier; alternate means of carriage; application of a different table of values for determining carriage charges; or, application of a service charge.

Returning to step 122, if the response to the query at step 122 is "NO," however, then the method advances to step 128 where shipping charges are determined in respect of the parcel's dimensions and any other criteria established within the application program's data table values. From step 128, the method advances to step 130 where the system prepares shipping documentation which might comprise: shipping labels; waybills; and appropriate barcoding. The method then prepares a carrier manifest, at step 132, indicative of parcels prepared for shipping. The method then advances to step 134 where the parcel is placed into its proper shipping channel.

As can be appreciated by those skilled in the art, a number of variations of the subject invention are possible. These variations include, but are not limited to: the desired distance between the sensor supporting apparatus and the weighing platform; the capabilities of the parcel processing application; the extent to which the platform is pre-calibrated with marks of a known distance apart; the use of varied scanner or detector arrays; and, the use of conveyors of varied ability to propel the parcel into the field of measurement. If a conveyor is used to move parcels through the field of measurement, then the capabilities of the weighing platform will necessarily be altered to accommodate weigh in motion requirements.

It is to be understood that the present invention is not to be considered as limited to the specific embodiment described above and shown in the accompanying drawings, which merely illustrates the best mode presently contemplated for carrying out the invention and which is susceptible to such changes as may be obvious to one skilled in the art, but rather that the invention is intended to cover all such variations, modifications and equivalents thereof as may be deemed to be within the scope of the claims appended hereto.

What is claimed is:

1. A method for measuring the dimensions of a parcel, comprising the steps of:
    (a) placing a parcel in a corner of a field of measurement; said field of measurement comprising a flat surface; said flat surface meeting at substantially right angles with two upright adjacent walls; said adjacent walls having at their base a corresponding calibrated reflective strip; said adjacent walls further having a reflective strip on at least one of said adjacent walls along the angle where said adjacent walls meet and running from the point where said adjacent walls meet said flat surface upward to a height less than, or equal to, the height of said at least one upright adjacent wall;
    (b) activating a first sensor placed at a second corner of said field of measurement wherein said second corner is directly opposite said corner in which said parcel is placed;
    (c) having said first sensor measure a length and a width of said placed parcel by counting a first visible set of calibration marks along said base of said adjacent upright walls, subtracting said first set of visible calibration marks from a first predetermined number of possible calibration marks and thereby calculating said length and width of said placed parcel; and
    (d) activating a second sensor wherein said second sensor is in a position above said first sensor and high enough above said flat surface of said measurement field so as to measure a height of said placed parcel by counting a second visible set of calibration marks along said angle formed where said adjacent upright walls meet, subtracting said second set of visible calibration marks from a second predetermined number of possible calibration marks and thereby calculating said height of said placed parcel.

2. The method of claim 1, wherein said flat surface is the weighing surface of a scale capable of calculating a weight of said placed parcel.

3. The method of claim 1, wherein said calculated length, width and height are displayed on a display or monitor.

4. The method of claim 1, wherein said calculated length, width and height are transmitted to a parcel processing system.

5. The method of claim 2, wherein said calculated weight is displayed on said display or said monitor.

6. The method of claim 2, wherein said calculated weight is transmitted to said parcel processing system.

7. The method of claim 1, wherein said first sensor and said second sensor are in combination and placed at said second corner of said field of measurement and high enough above said flat surface of said measurement field so as to measure said length, said width, and said height of said placed parcel by counting said first visible set and said second visible set of calibration marks.

8. The method of claim 1, wherein said possible calibration marks are a series of lines spaced a known distance apart and corresponding to at least one measurement scale so that predetermined number of lines corresponds to a unit of said at least one known measurement scale.

9. An apparatus for measuring the dimensions of a parcel comprising:
    (a) a supporting means for supporting a parcel placed thereupon for measurement;
    (b) a first calibration means of a known number and dimension of calibration marks for determining a length and a width of a parcel placed upon said supporting means;
    (c) a second calibration means of a known number and dimension of calibration marks for determining a height of a parcel placed upon said supporting means;
    (d) a first sensor means for determining said length and said width of said placed parcel by sensing a first visible set of calibration marks on said first calibration means and subtracting said first visible set of calibration marks from a known number of calibration marks on said first calibration means and determining said length and said width thereby;
    (e) a second sensor means for determining said height of said placed parcel by sensing a second visible set of calibration marks on said second calibration means and subtracting said second visible set of calibration marks from a known number of calibration marks on said second calibration means and determining said height thereby; and
    (f) data processing means for: controlling said first sensor means and said second sensor means; receiving and processing data from said first and said second sensor means; calculating said measurements for length, width and height; transmitting said measurements to a display means or to a parcel processing system.

10. The apparatus of claim 9 wherein said supporting means is the weighing surface of a scale capable of calculating a weight of said placed parcel.

11. The apparatus of claim 9, wherein said calculated length, width and height are displayed on a display means.

12. The apparatus of claim 9, wherein said calculated length, width and height are transmitted to a parcel processing system.

13. The apparatus of claim 9, wherein said calculated weight is displayed on said display means.

14. The apparatus of claim 10, wherein said calculated weight is transmitted to said parcel processing system.

15. The apparatus of claim 9, wherein said first sensor means and said second sensor means are in combination and placed so as to measure said length, said width, and said height of said placed parcel by counting said first visible set and said second visible set of calibration marks.

16. A method for measuring the dimensions of a parcel, comprising the steps of:
    (a) placing a parcel in a first corner of a field of measurement; said field of measurement comprising:
        (i) a flat surface with a first series of encoder lines of known dimension and spacing marked thereupon and wherein said first series of encoder lines forms a chevron pattern comprising an angle of 90 degrees progressing outwardly from a predetermined corner of said field of measurement; and
        (ii) said flat surface meeting, at substantially right angles, with at least one upright adjacent wall tangent to said first corner; said adjacent wall having a second series of lines of known dimension and spacing marked thereupon, wherein said second series of lines begin at, and are parallel to, said at least one upright adjacent wall's base and continue upward to a height less than, or equal to, said at least one adjacent wall's height;
    (b) activating a scanner at a second corner of said field of measurement wherein said second corner is positioned directly opposite said first corner, and said scanner is further positioned at a height wherein said scanner can scan said first series and said second series of encoder lines;

(c) having said scanner measure a length, a width, and a height of said placed parcel by:
  (i) counting a first set of visible encoder lines upon said flat surface of said measurement field;
  (ii) counting a second series of visible encoder lines upon said at least one adjacent upright wall; and
  (iii) subtracting said first set of visible encoder lines from a first predetermined number of possible encoder lines in said first series;
  (iv) subtracting said second set of visible encoder lines from a second predetermined number of possible encoder lines in said second series; and;
  (v) calculating said length, width and height of said placed parcel.

* * * * *